(12) United States Patent
Fickey et al.

(10) Patent No.: US 7,551,984 B1
(45) Date of Patent: Jun. 23, 2009

(54) METHOD OF TRACKING POWER OUTAGES

(75) Inventors: Karl J. Fickey, Lake Milton, OH (US);
David V. Homsher, Tallmadge, OH (US)

(73) Assignee: First Energy Corp., Akron, OH (US)

( * ) Notice: Subject to any disclaimer, the term of this patent is extended or adjusted under 35 U.S.C. 154(b) by 456 days.

(21) Appl. No.: 11/368,799

(22) Filed: Mar. 6, 2006

Related U.S. Application Data

(60) Provisional application No. 60/658,901, filed on Mar. 4, 2005.

(51) Int. Cl.
*G06F 17/00* (2006.01)
(52) U.S. Cl. .................. 700/291; 700/286; 700/292; 702/58
(58) Field of Classification Search ............... 700/286, 700/287, 288, 289, 292; 395/435; 702/58
See application file for complete search history.

(56) References Cited

U.S. PATENT DOCUMENTS

| | | | |
|---|---|---|---|
| 3,602,703 A | 8/1971 | Polenz | |
| 3,789,201 A | 1/1974 | Carpenter et al. | |
| 4,916,328 A | 4/1990 | Culp, III | |
| 5,153,837 A | 10/1992 | Shaffer et al. | |
| 5,301,122 A | 4/1994 | Halpern | |
| 5,568,399 A | 10/1996 | Sumic | |
| 5,805,458 A | 9/1998 | McNamara et al. | |
| 5,974,403 A | 10/1999 | Takriti et al. | |
| 6,021,402 A | 2/2000 | Takriti | |
| 6,259,972 B1 | 7/2001 | Sumic et al. | |
| 6,628,207 B1 | 9/2003 | Hemminger et al. | |
| 6,671,654 B1 | 12/2003 | Forth et al. | |
| 6,687,574 B2 | 2/2004 | Pietrowicz et al. | |
| 6,778,882 B2 | 8/2004 | Spool et al. | |
| 6,865,450 B2 | 3/2005 | Masticola et al. | |
| 2003/0040845 A1 | 2/2003 | Spool et al. | |
| 2003/0040847 A1 | 2/2003 | Tsui | |
| 2004/0010478 A1 | 1/2004 | Peljto et al. | |
| 2004/0225625 A1 | 11/2004 | Van Gorp et al. | |

OTHER PUBLICATIONS

"Animals, Power systems, and Reliability in a deregulated environment", Frazier, Southerin Engineering Company, IEEE 1999.*
"Five-Year Electrical Service Reliability Study 1999-2003", Oregon Investor Owned Utilities, May 2004.*
"Introduction to Relational Databases", Gilfillan, printed from http://www.databasejournal.com/sqletc/article.php/1469521, Jun. 2002.*

* cited by examiner

*Primary Examiner*—Michael D Masinick
(74) *Attorney, Agent, or Firm*—Brouse McDowell; Heather M. Barnes

(57) ABSTRACT

A method for analyzing historical outages at the customer level for the purposes of determining root-cause and possible corrective actions is described herein. The present invention enables a utility to identify problem areas and prevent future outages from occurring.

8 Claims, 14 Drawing Sheets

Total Customers OUT-1334

Last updated 03/03/2006 4:50:25 PM
FirstEnergy

Totals
Customers OUT by Company - CENTRAL JCP&L 35

Last updated 03/03/2006 4:50:26 PM
Outage by

Company
Customers OUT in Cleveland - Brooklyn 1 Miles 1

Last updated 03/03/2006 4:50:26 PM
Cleveland

Ohio
Customers OUT in Ohio Edison/Penn Power-Akr

Last updated 03/03/2006 4:51:50 PM
Ohio Edison

Penn Power
Customers OUT in Penelec-Altoona 1 Johnstown

Last updated 03/03/2006 4:50:29 PM
Penelec

Home

Claims Reports Homepage

Activity Report

Sunday

Monday

Tuesday

Wednesday

Thursday

Friday

Saturday

Data Error Report
Monday, February 27, 2006

| REGION | TROUBLE REPORTED | LOCATION | EQUIPMENT | OUTAGE TYPE | SUB | CIRCUIT REFERENCE |
|---|---|---|---|---|---|---|

CENTRAL NJ

StreetLight-Light Off    NJ    Street Light
*IN FRONT OF 12345 S.BLVD- POLE#1412    *T-man replaced 50W bulb on pole #1412 on 2-26-06*
On Pole Damaged    NJ    Trouble
* ESTATES, STREET LIGHT POLE LEANING BADLY, POLE #5799, BETWEEN 1245 MAIN AND
1247. RDOYNE..tman found 17ft. fiberglass standard with 50w hp colonial head on it, safe for now but needs followup.

StreetLight-On/Off Lights    NJ    Street Light
*STREETLIGHT NEXT TO DRIVEWAY OF 280 RANDOLPH RD IS CYCLING OFF/ON ALL NIGHT.
pole jc38865frt 70hps bulb replaced lb/rdo StreetLight-Light Off    NJ -000314287008    Street Light
*STREETLIGHT FRONT OF 1234 XST; MAPLE AVE.POLE#JC-6570-BC*T-man reports need new 50W HPS Cobra on JC6570

On-Safety Force on Site    NJ    Trouble
*911 FIRE AT HOUSE FIRE DEPT ON SCENENEAREST XSTR LIFE AND LIMB,CAN'T PUT OUT FIRE. ETA 1 HR BUT WE
ARE ON OUR WAY DMF BDIETER. RECREATE NOTIFICATION 314291333, PER ROB IN RDO.
No Lights    Unlocated Long Branch district    Trouble
*NO ELECTRIC TO METER PAN FOR TEMP SERVICE TFLEMMING* cncl order per customer had electrician take of prblmlb/rdo
Part Off-Safety Force On-    Unlocated Berkeley District    Trouble
*911 MAIN BLVD. AND MAIN ROAD TRAFFIC LIGHT BLINKING ON ONE SIDE.THEY WANT TO BE ADVISED IF THIS IS
SOMETHING WE TAKE CARE OF. POLICE ON LOCATION. SSTYER spk to police dept. want tman to check volt in area.
lori tman adv volt 120, 240, 240 light
On Pole Damaged    NJ    Trouble
* SEE ORDER #314215155-CONSTANT ON HAS BEEN FIXED BUT POLE IS UNSTEADY. IF YOU TOUCH POLE IT LEANS
AND BP WORRIED IT WILL FALL OVER-JER-added more dirt and retamped pole and level. made cust contact
StreetLight-Light Off    000314286476    Street Light
*On Pole #44276 need to replace 70W HPS Colonial Black
StreetLight-Light Off    NJ-000314288954    Street Light
*POLE#JC1356BK LOCATION OFF OF MAIN.MWALKERTEAM1 Tman on pole #1356 need to replace100W Mercury Vapor
Cobra head*

TOTAL CASES WORKED    10

CENTRAL OH

AreaLight-Light Off    OH    Street Light
JENKINS FOUND A BAD HEAD ON THE STREETLIGHT BY MAIN. TMANSTATED HE WILL R/P TOMORROW AFTERNOON OnUg Dug Up Wires    OH    Trouble
CALL MOVE TO NEW ORDER TO MAKE IT LOCATED

FIG-3

*First Energy*

First Energy

RDO'S
Storm Page
FE Portal
Radar Images
Graph
Weather Text
BUDGET
Transmission One Lines
Construction Standards
MSDS Chemical Look up
CRI Report
Street Light Reports Employment Center Investor Information First Energy in the News FirstEnergy services Welcome to the First Energy Reports page Select the report you want to view FollowUp Report    [Sunday ▼] [View]

Error Report    [Sunday ▼] [View]

Potential LockOut Report    [View]

Closed LockOut Report [Sunday ▼] [View]

The Potential LockOut Report is Changed

Page Last modified: thursday, March 11, 2004    00192

FIG-4

24 Hour Follow Up Report

Monday, February 27, 2006

| REGION | CREW_AREA | DEPARTMENT to NOTIFY | ORDER# | FOLLOW UP REMARKS | ORDER COMMENTS | CAUSE | CAUSE_POLE |

CENTRAL NJ
Berkeley, CA

Notify Claims-Issue Bill

Dispatcher
  Crew  24331

1015778-1
    SAP Follow Up Location
        Auto generate of SAP followup due to billable cause code

Notify Line

Dispatcher
  Crew  24267

1015615-1
    SAP Follow Up Location
        *PER FAX POLE#40296DV IS OUT... X-ST VINCENT.. BDIETER
        *tman said need to replace bad 50hps cobra head
        on bt4028dvt Dispatcher
  Crew 1015863-1
    SAP Follow Up Location
        *1015863 NJ DUP ORDER FOR PO1014676 FOLLOWUP*

Dispatcher
  Crew 1016048-1
    SAP Follow Up Location
        1009 BAYVILLE,NJ..Refused. Fuse Installation BT45251B 65K...tman said
        broken taps and open wires on jc459-kevin stevens is going out to check
        and 2 man crew will fix...All in lights @1600 HRS

Notify Streetlight

FIG-5

24 Hour Activity Report

Tuesday, February 28, 2006

| BY DIST | TROUBLE REPORTED | CAUSE | EQUIPMENT | OUTAGE_TYPE | REC_CLR | REC_DSP | REFERENCE |
|---|---|---|---|---|---|---|---|
| Ashtabula District | | | | | | | |
| WB H003WB Part Off | | Customer Equipment | | Outage | 81 | 49 | |
| GOOD VOLTAGE AT BASER | | | | | | | |

Doe, Jane S

| | Street Light- Light Off | Call Error | | Streetlight | 1134 | 1133 | |

*3 OUT MAIN @ MAIN, ALL4 MARKED W/GREEN TAPE ON NORTH SIDE OF STREET, POLE3S 558357-558353, 1ST1/4 MILE OF MIDDLE =ROAD GOING EAST OF MAIN I spoke with joe @ Acme this is a duplicate ticket. vc

| | Street Light- Light Off | Call Error | | Streetlight | 1130 | 1129 | |

*STREET LIGHT ON EAST SIDE OF MAIN MARKED WITH GREEN TAPE, POLE#2064616 I spoke with joe @ Acme this is a duplicate ticket. vc

| | Area Light- Light Off | Call Error | | Streetlight | 1130 | 1129 | |

*2AREA LIGHTS ALONG FENCE ON N SIDE OF MIDDLE @CORNER OF MAIN ARE OUT, THE MAINTENANCE MAN MARKED THEM W/GREEN TAPE NO NEED TO ACCES PLANT FOR REPAIR. I spoke with joe @ Acme this is a duplicate ticket. vc

| | Street Light- On/ Off | Equipment Failure | | Streetlight | 1304 | 1303 | |

*RT 6 POLE NUMBER 2 POLE EAST FROM 279328 POLE BROKEN LEANING 3 PRIMARY HANGING IN AIR NO HAZARD TP

| ZN L002ZN | Area Light- Light Off | Equipment Failure | | Streetlight | 5256 | 5255 | |

X CALLED FOR SERV ON OAL SHE SAID THAT IT HAS GONE OUT 10 TIMES IN LESS THAN 30 DAYS def 400w mv flood lght replaced with same 2/27

| VN L004VN | Part Off | Previous Lightning | | Outage | 82 | 3 | |

REPLACED 3 WIRE OPEN LOOP W/#4 TRIPLEX TREE TRIM NEEDE THEN LOOP NEEDS TO BE RAISED. OKT

| RW H001RW | No Lights | Unknown | OH Transformer CXE-562195 AC | Outage | 88 | 7 | |

REPLACED 3 WIRE OPEN LOOP W/#4 TRIPLEX TREE TRIM NEEDE THEN LOOP NEEDS TO BE RAISED. OKT

| SA L001SA | Part Off | Customer Equipment | | Outage | 93 | 8 | | brnd up cnncts at cap mwd ok-p

Smith, John Q

FIG-6

24 Hour Outage Report — Wednesday, March 01, 2006

| SUBSTATION | CIRCUIT | OUTAGE_TYPE | CAUSE | DEVICE PHASE | EQUIPMENT | REFERENCE# | TIME COUNT | CUST_MIN |
|---|---|---|---|---|---|---|---|---|
| USER NAME | CREATE DT/TM | | CAUSE POLE | FOLLOW UP | | | | |

Ashtabula East CA
BD   H011BD   Outage   Equipment Failure   Transformer-OH BC   OH Transformer CXE-278020 BC   153   10   1530
3/1/2006 12:18:02 PM       OH Transformer CXE-278020 BC    Notify Line
OH***REPR'D BRKN BOX, OK-T OHL TO FOLLOW UP TO SURVEY POLE BENT 2 PLCS REPAIR VERY TEMP

Ashtabula East CA   *TOTAL CUSTOMERS AFFECTED 10   TOTAL CUSTOMER MINUTES 1530   CAIDI 153*

Brooklyn, CA
JY   H009JY   Outage   Equipment Failure   Circuit Lockout   ABC Circuit JY-H009JY (401200009)   107   1   107
3/1/2006 10:14:07 PM       UG Access Pt    Notify Network/Ducted
perm2210,foa 2240 ab50,50qt2,investigated false wire dn report,delayed restoration, tried tripped 2307,n06-1327 need to repair feed point cable

Brooklyn, CA   *TOTAL CUSTOMERS AFFECTED 927   TOTAL CUSTOMER MINUTES 88,037   CAIDI 95*

Concord, CA
NP   L004NP   Outage   Line Failure   Single Customer  A   UG Transformer CXE-383219 A   81   1   81
3/1/2006 10:25:07 AM       UG Transformer CXE-383919 A    Notify Line
TIED ABOVE GROUND, 10715, OH 1/0 LAT FAULTED JPR'D ABOVE GROUND #4 TRIPLEX ISOLATED BOTH ENDS

Concord, CA   *TOTAL CUSTOMERS AFFECTED 1   TOTAL CUSTOMER MINUTES 81   CAIDI 81*

Strongsville, CA
GA   L007GA   Outage   EquipmentFailure   Single Customer  A   UG Transformer CXC-021059 A   250   1   250
3/1/2006 1:06:04 PM       UG Transformer CXC-021059 A    Notify Line
SEC CHAMBER BURIED 10', COULDN'T FIND DUG UP SECOND SEC CHAMBER, 1/0 HOT LEG LOOP LATERAL CORR OFF CRAB.
UG CREW TO RAISE SEC CHAMBER, CUST LAWN DUG UP WITH CONE ON TOP.

Strongsville, CA   *TOTAL CUSTOMERS AFFECTED 1   TOTAL CUSTOMER MINUTES 250   CAIDI 250*

Westlake, CA
DG   L001Dg   Outage   EquipmentFailure   Single Customer  A   OH Transformer CXC-217049 A   132   1   132
3/1/2006 8:39:06 AM       UG Transformer CXC-217049 A
SPLICED XFMR TAILS AND RENEWED CONN OK-ARRIVED@1020, WILL TAKE 20 MIN FORCED OUTAGE TO REPLACE XFRMR TAILS
DISPATCHED @1000 TO ASSIST

FIG-7

24 Hour Street Light Report
Friday, February 24, 2006

BY AREA TROUBLE REPORTED TROUBLE CREW CREATE TIME REPAIR TIME TYPE REC_CLR DSP_CLR REFERENCE

Mayfield, CA

Street Light - Light Off    2693-wade    2/23/2006 1:29:11 PM    2/24/2006 12:03:00 PM    Street Light    1354    338

CLLD OFFC SD LGHT IS ON CORNER OF MAIN HAS BEEN OFF FOR MONTHS PLS FIX AND CONTACT CUSTOMER

Street Light - On/Off Lights    2693-wade    2/22/2006 11:24:09 PM    2/24/2006 9:58:00 AM    Street Light    2914    337

IN BACK OF BUILDING STATES STREET LIGHT GOES OFF FOR 15 MINUTES AT A TIME THEN COMES ON FOR 1 MINUTE AND GOES BACK OFF AGAIN BUSINESS OUT HERE NEEDS IT FOR SECURITY REASONS

Street Light - Light Off    2693-wade    2/23/2006 8:40:11 AM    2/24/2006 10:03:00 AM    Street Light    1644    340

CORNER OF DRIVEWAY RIGHT IN HOME

Street Light - Light Off    2693-wade    2/23/2006 12:52:10 PM    2/24/2006 1:30:00 PM    Street Light    2918    428

1234 MAIN BETWEEN THIS ADDRESS AND 1236 MAIN

Street Light - Light Off    2693-wade    2/22/2006 12:51:12 PM    2/24/2006 1:29:00 PM    Street Light    2918    427

HAS BEEN OUT A WHILE NOW

Area Light - Light Off    2693-wade    2/23/2006 8:38:10 AM    2/24/2006 10:01:00 AM    Street Light    1644    339

3 LIGHTS OUT-#1 POLE #73954 2 LIGHTS IN POLE THE LIGHT ON THE EAST SIDE IS THE PROBLEM NEW LIGHT IN FRONT BACK IS NORMAL STREET LIGHT NEAR DOOR #30280 IN BACK POLE#662841#3-B AREA LIGHT

Area Light - Light Off    2693-wade    2/23/2006 10:29:14 AM    2/24/2006 12:00:00 PM    Street Light    1531    335

OAL LIGHTS IN PARKING LOT IS OUT TG

FIG-8

24 Hour Troubleman Activity Report — Thursday, March 02, 2006

BY AREA TROUBLE REPORTED CAUSE    EQUIPMENT    DEVICE    COUNT TYPE    REC_CLR    DSP_CLR    REFERENCE 2693-wade
Mayfield, CA

| | TROUBLE REPORTED | CAUSE | EQUIPMENT | DEVICE | COUNT TYPE | REC_CLR | DSP_CLR | REFERENCE |
|---|---|---|---|---|---|---|---|---|
| 1B    L002MB prv lights not cel | Street Light - Light Off | | | Customer Equipment | Street Light | 2861 | 104 | |
| | Street Light - On/Off Lights Notify | | | Equipment Failure | Street Light | 54 | 54 | |
| *25421 HIGHLAND REPLACED 400 MERC LIGHT | | | | | | | | |
| M    L005LM | Area Light - Light Off | | | Equipment Failure | Street Light | 3057 | 1610 | |
| STATES THAT AREA LIGHT ON POLE #23651 IS OUT | | | | | | | | |
| N    H006LN | Street Light - On/Off Lights | | | Equipment Failure | Street Light | 2959 | 1432 | |
| CLD TO REPORT THAT STREET LIGHT GOES ON/OFF IN MIDDLE OF NIGHT | | | | | | | | |
| 1B    L007MB *POL#340215* | Street Light - Light Off | | | Equipment Failure | Street Light | 2816 | 105 | |
| H    H008SH    Street Light - Light Off *ST LGHT ACROSS FROM 1234 MAIN* | | | | Equipment Failure | Street Light | 2767 | 1437 | |
| B    H011BB    Street Light - Light Off *ST LGHT IN FRONT OF HOME IS OUT* | | | | Equipment Failure | Street Light | 3009 | 1513 | |
| H    H001SH    Street Light - Light Off *ST LGHT AOUT AT 1524 MAIN* | | | | Equipment Failure | Street Light | 2770 | 1441 | |
| 1B    L008MB    Street Light - Light Off *ST LGHT AOUT AT 999 MAIN* | | | | Equipment Failure | Street Light | 2755 | 1435 | |
| H    H011SH    Street Light - Light Off *ST LGHT AOUT AT 1325 MAIN* | | | | Equipment Failure | Street Light | 2772 | 1442 | |
| H    H011SH    Street Light - Light Off *ST LGHT AOUT AT 1325 MAIN* | | | | Equipment Failure | Street Light | 2772 | 1442 | |
| 1B    L008MB    Street Light - Light Off *LIGHT ACROSS FROM ADDRESS* | | | | Equipment Failure | Street Light | 2772 | 1442 | |
| H    H011SH    Street Light - Light Off *ST LGHT AOUT AT 1325 MAIN* | | | | Equipment Failure | Street Light | 2772 | 1442 | |

CASES WORKED 12                                TOTAL HOURS ASSIGNED 200.30

FIG-9

Click Here to get the Microsoft snapshot viewer to view these Charts

Ohio Edison/Penn Power Storm Chart

Cleveland Electric Illuminating Storm Chart

Toledo Storm Chart

Central NJ Storm Chart

North NJ Storm Chart

Penelec Storm Chart

Met-Ed Storm Chart

FIG-11

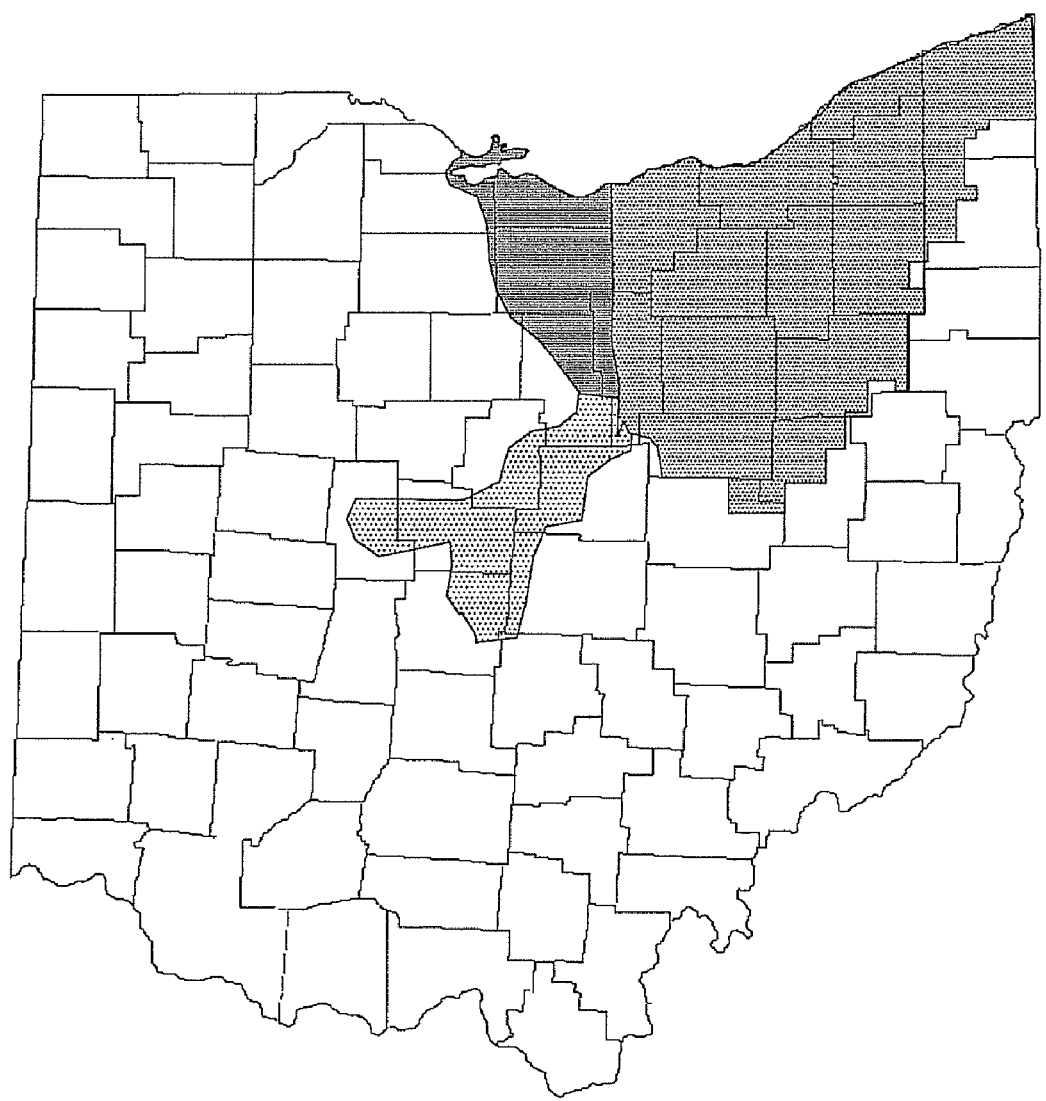
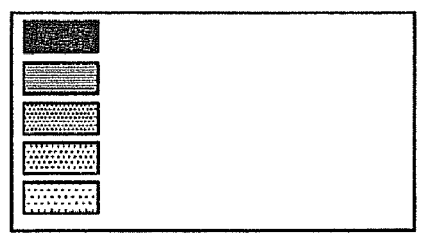
FIG-13

Current Warnings for Ohio
*This page lists only the warning categories that have current data. For more information see the about page.*

No Current Warnings

IWIN main page

FIG-14

METHOD OF TRACKING POWER OUTAGES

This application claims priority to a provisional patent application, U.S. Ser. No. 60/658,901, filed Mar. 4, 2005, entitled METHOD OF TRACKING POWER OUTAGES.

I. BACKGROUND OF THE INVENTION

A. Field of Invention

This invention pertains to the art of utilities, and even more particularly to the art of tracking power outages, and even more particularly to tracking historical power outages at the individual customer level.

B. Description of the Related Art

It is known in the art to have outage management systems, wherein customers would call in and report to a call center that their lights were out, or that there was a problem of some kind. These bits of information were stored in the outage management system where they are then worked as a project. The call data that comes in, with the earlier software, is based on, for instance AM/FM, or a GIS model. The software was designed to know where all of the customers are located and how the electricity is delivered to them. The call data is compared against that model and a prediction is made to determine that the outage encompasses a set number of customers. The data is then given to a trouble man, or somebody in the field, to check out, analyze, fix, and restore. The document that earlier software historically creates is essentially one record that says a certain device was out, it went out at this time, it was restored at this time, doing these steps, and it affected this number of customers. All of this information is stored on one record. Each customer's call was one record. Each call then went into the system and was recorded either to an interactive voice response system or live customer service rep contact. If only one call was made, it showed up in the system as a single call. The system would compare numerous calls to see if there was anything in common with them, such as each call having a common up-line fuse for instance, and since the received calls have a common up-line fuse and that common up-line fuse serves 20 people, just because the other 15 did not call in does not mean that their lights are not out.

It is known to use a CRI (Circuit Reliability Index). The single records of outages were associated with a circuit, not the individual customer. The circuits would be grouped together and run through a formula that would then compare it against an average customer's expectations and determine if the entire circuit was performing above, below, or at the customer's expectations. Previously, the utilities would know that an entire circuit had failed the customer's expectations. The circuit performance was bad and the utility would have to go out and patrol the whole circuit or do a deep dive into the data that made up that circuit calculation to see if there was a specific problem that could be isolated.

In a typical electrical distribution system, electrical energy is generated by an electrical supplier or utility company and distributed to consumers via a power distribution network. The power distribution network is the network of electrical distribution wires which link the electrical supplier to its consumers. Typically, electricity from a utility is fed from a primary substation over a distribution cable to several local substations. At the substations, the supply is transformed by distribution transformers from a relatively high voltage on the distributor cable to a lower voltage at which it is supplied to the end consumer. From the substations, the power is provided to industrial users over a distributed power network that supplies power to various loads. Such loads may include, for example, various power machines or computer/electronic equipment.

At the consumer's facility, there will typically be an intelligent electronic device ("IED"), such as an electrical energy/watt-hour meter, connected between the consumer and the power distribution network so as to measure quantities such as the consumer's electrical consumption or electrical demand. Such a meter may be owned by the consumer and used to monitor and control consumption and report costs or may be owned by the utility and used to monitor consumption and report revenue.

IED's include devices such as Programmable Logic Controllers ("PLC's"), Remote Terminal Unit ("RTU"), meters, protective relays and fault recorders. Such devices are widely available that make use of memory and microprocessors and have limited remote reporting capabilities. A PLC is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is typically designed as an industrial control system. An exemplary PLC is the SLC 500 Series, manufactured by Allen-Bradley in Milwaukee, Wis.

A meter is a device that records and measures electrical power consumption. Energy meters include, but are not limited to, electric watt-hour meters. In addition, meters are also capable of measuring and recording power events, power quality, current, voltage waveforms, harmonics, transients, or other power disturbances. Revenue accurate meters ("revenue meter") are revenue accuracy electrical power metering devices which may include the ability to detect, monitor, or report, quantify, and communicate power quality information about the power which they are metering. An exemplary revenue meter is model 8500, manufactured by Power Measurement Ltd, in Saanichton, B.C. Canada.

A protective relay is an electrical device that is designed to interpret-input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is type N and KC, manufactured by ABB in Raleigh, N.C.

A fault recorder is a device that records the waveform resulting from a fault in a line, such as a fault caused by a break in the line. An exemplary fault recorder is IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses. An exemplary electromechanical meter is the AB1 Meter manufactured by ABB in Raleigh, N.C. Such conversion devices are known in the art.

In the early 1980's, the Computer Business Manufacturers Association (CBEMA), which is now the Information Technology Industry Council (ITIC), established a susceptibility profile curve to aid manufacturers in the design of power supply protection circuits. This power quality curve has since become a standard reference within the industry, measuring all types of equipment and power systems and defines allowable disturbances that can exist on the power lines. Additionally, the semiconductor industry has established its own standard SEMI F47 curve for power quality, which is similar to the CBEMA curve but instead is focused on semiconductor power quality and associated supporting equipment.

In more recent years the electric utility marketplace has moved towards deregulation, where utility consumers will be able to choose electrical service providers. Until now, substantially all end users purchased electric power they needed from the local utility serving their geographic area. Further, there was no way for utilities to guarantee the same reliability to all consumers from the utility because of different connection points to the transmission and distribution lines. With deregulation it is essential for consumers to be able to measure and quantify power reliability from their suppliers in order to ensure they are receiving the service they have opted for. Such service may involve various pricing plans, for example on volume, term commitments, peak and off-peak usage or reliability.

Power reliability is typically measured by several various indices. These indices include System Average Interruption Frequency Index ("SAIFI"), Customer Average Interruption Duration Index ("CAIDI"), System Average Interruption Duration Index ("SAIDI"), Average System Availability Index ("ASAI") and Momentary Average Interruption Duration Index ("MAIFI"). Each index provides a measure, in terms of ratios or percentages, of interruptions in delivery of electrical power, wherein an interruption may be classified as a complete loss of electrical power or where the quality of the delivered electrical power falls below or exceeds a pre-determined threshold. SAIFI measures the ratio of the total number of customer interruptions to the total number of customers served, hence the average. Lower averages signify better reliability. CAIDI measures the total customer hours interrupted to the total customer interruptions, in minutes. The lower the measure, the better the reliability. SAIDI measures the ratio of customer hours interrupted to total customers served, in minutes. Again, the smaller the number the better the system. ASAI is a ratio of total number of customer hours the electric service has been turned on to the number of customer hours the service has been demanded. It is measured as a percentage and the higher the percentage, the better the reliability. The MAIFI measurement considers interruptions that last less than 5 minutes. System Average RMS Variation Frequency Index ("SARFI") is another power quality index that provides counts or rates of voltage sags, swells and/or interruptions for the system. There are two types of SARFI indices—SARFI_x and SARFI_curve. SARFI_x corresponds to a count or rate of voltage sags, swells and/or interruptions below a threshold where SARFI_curve corresponds to a rate of voltage sags below an equipment compatibility curve, such as a CBEMA or SEMI curve. Mean Time Between Failure ("MTBF") is another measurement to indicate reliability. MTBF is usually expressed in hours and is calculated by dividing the total number of failures into the total number of operating hours observed. For example a device may specify MTBF as 300,000 hours. If this device operates 24 hours a day, 365 days a year it would take an average of 34 years before the device will fail.

The present invention provides methods for tracking individual utility outages at the customer level. The difficulties inherit in the art are therefore overcome in a way that is simple and efficient, while providing better and more advantageous results.

II. SUMMARY OF THE INVENTION

According to one aspect of the present invention, a method of determining and recording power outages at the individual customer level includes receiving a signal that a power outage has occurred, relaying the information to a database, determining the circuit affected by the power outage, determining the number of customers associated with the circuit, and creating an individual outage record for each associated customer.

In accordance with another aspect of the present invention, individual records are maintained for each customer.

In accordance with another aspect of the present invention, historical power outages are analyzed to determine the cause and possible corrective actions.

In accordance with another aspect of the present invention, an after-the-fact analysis is conducted of where outages have occurred historically and the need for increased reliability.

In accordance with another aspect of the present invention graphic representations are created to show relative levels of compliance with customer expectations for power outages.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein:

FIG. 1 is a web page of the online, hand-held device report;

FIG. 2 is a web page of the claims and activity reports;

FIG. 3 is a data error report;

FIG. 4 is a reports page, showing follow-up reports, error reports, potential lockout reports, and closed lockout reports;

FIG. 5 is a twenty-four hour follow-up report;

FIG. 6 is a twenty-four hour activity report;

FIG. 7 is a twenty-four hour outage report;

FIG. 8 is a twenty-four hour street light report;

FIG. 9 is a twenty-four hour troubleman activity report;

FIG. 11 is a regional storm chart page;

FIG. 13 is a map showing outages in the northeastern Ohio region; and,

FIG. 14 is a list of current storm warnings in Ohio.

IV. DESCRIPTION OF THE INVENTION

Figure 10:
FIG. 10 is a web page showing the applications of the present invention.
Figure 12:
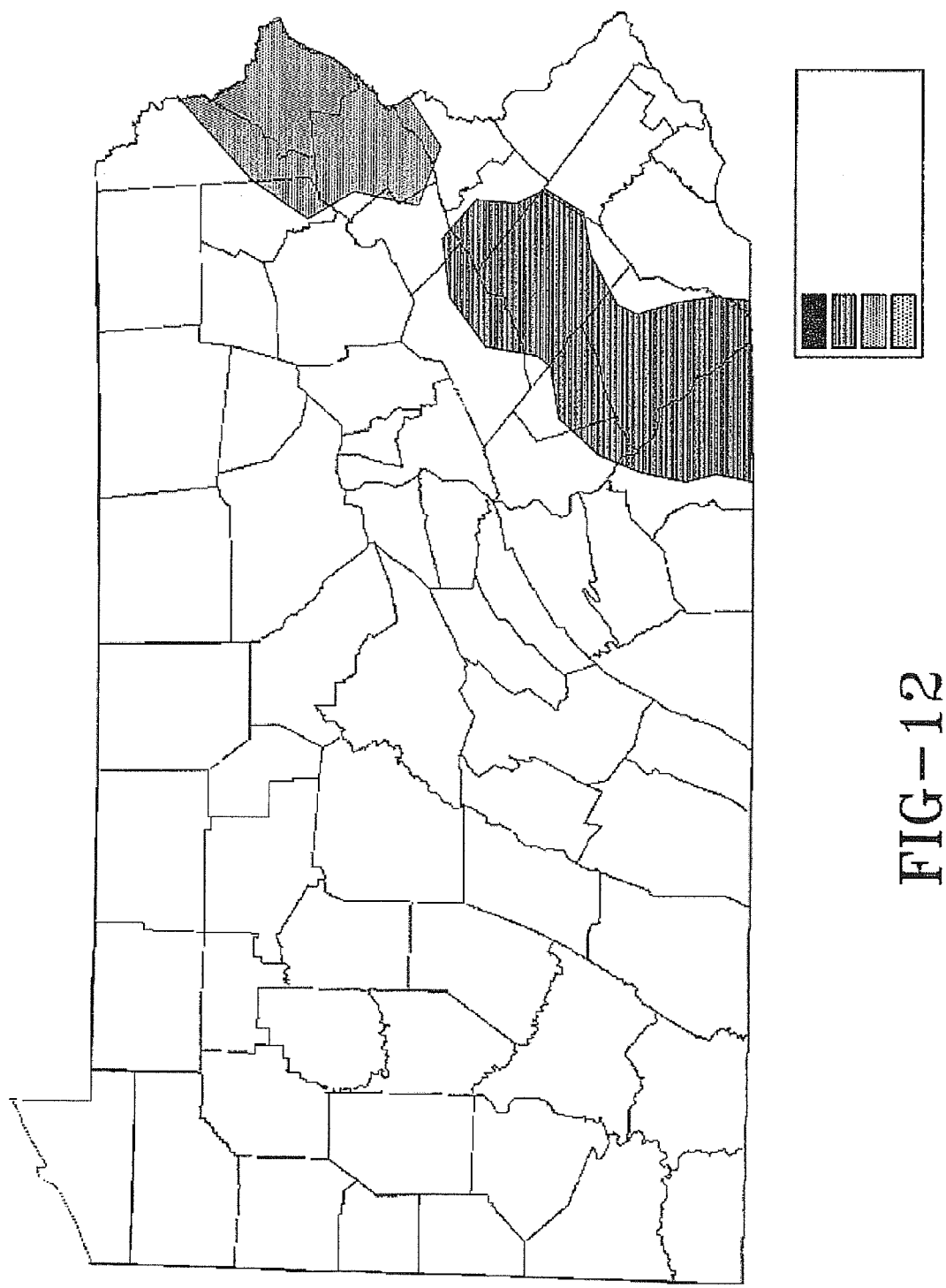
FIG. 12 is a map showing outages in the Pennsylvania region.

Referring now to the drawings wherein the showings are for purposes of illustrating at least one embodiment of the invention only and not for purposes of limiting the same, FIGS. 1-14 show various reports created by the present invention. The various reports provide details on the various power outages, what caused the power outage, how long the power was out, what equipment was repaired, the customer's name and address, as well as follow-up reports to determine if the problem has been remedied. It is to be understood that these reports are merely embodiments of the present invention, and are not intended to limit the invention in any manner. It is to be understood that the reports can be modified as necessary for any of the variety of details. The FIGURES also show maps that provide pictorial representations of the power outages in a particular area. These maps display the general areas in which power outages occurred, as well as the number of customers in that area who experienced the power outages. The invention also provides maps that show different color dots on individual customers to show power outages in a particular area. In one embodiment, the dots are green, yellow, and red. The green dots represent that the individual customer exceeds the expectation with respect to power outages, the yellow dots represent that the individual customer has experienced an acceptable level of power outages but may be close to failing the expectations, and the red dots represent that the individual customer has failed the expectation with respect to power outages. It is to be understood that any manner of representing the relative level of meeting or not meeting expectations can be used, as long as chosen using sound business judgment.

In one embodiment of the present invention, a record is created for each and every individual customer (in this embodiment, a customer is any entity that pays an electric bill, which could be an individual in a house, a business, or an apartment complex, etc.) connected down line from a device that experiences difficulty. So instead of one record, if 50 customers were affected, 50 records are created, one for each customer. In this embodiment, in a situation where a customer's power was out, each record would contain the following information: the lights went off on this date, at this time, and they went back on this date and at this time, the lights went out for this reason, for this duration, and the related project number. Then the data, on a historical basis (for example, a year-to-date or rolling twelve months), is extracted from the database and each customer's outage history can be analyzed independently. The data can be used to review the performance at a particular service address to determine if it is meeting, failing, or exceeding expectations of a "typical customer." As an example, a mathematical routine is applied, wherein an outage that occurred yesterday is combined with the outage that occurred a month ago, as well as the one that occurred around Christmas of last year. The data is compared with the expectations to determine if this is too many outages, is not enough, or is it less than a typical average.

The above analysis creates an indicator that is based on an expectation scale, and, in one embodiment, if the indicator is exceeding, or at, the expectation, a green dot is applied to a map for that particular service address. If it is approaching the limit of failing expectations, a yellow dot is placed on the map for that particular service address. And if the indicator failed the expectations, a red dot is placed on the map for that particular service address. This allows analysis down to the customer and the utility can see individual customers within that circuit, because it is not always an entire circuit that is bad, but a portion of the circuit might go off, for example if a fuse blows.

The present invention can be used to determine emerging trends in power outages. For instance, there could be pockets of bad performance within a particular town or within a particular circuit. The invention would allow tracking of potential problems, in that the utility can review the different color dots on a particular area map and see where problem areas are developing. For example, a particular area may have a large number of yellow dots, where the expectations have not failed yet, but it may indicate a problem that needs to be addressed. The invention would allow the utility to have relevant information in order to analyze, and potentially fix, a problem before the failure of expectations occurs. The invention allows the utility to determine which portion of the circuit is performing poorly.

The present invention creates a record for each individual customer's meter. This record is associated with their account, provides the information that they were affected, beginning at this time, ending at this time, and for this reason. Each record on each account can be retrieved and a user can see all of the outage records and see the customer history. The data can also be used to show field personnel, design engineers, and the people maintaining the lines, where there are growing problems.

In another embodiment of this invention, the reports and applications can be made available via a handheld electronic device, such as a Palm Pilot® or a Blackberry®. The data can then be available to individuals who are not at the specific location where the database is located or those who are hooked up to the network. This enables the invention to be utilized in the field or at any other remote location. The details of how the reports and applications are uploaded to the handheld device are well known within the art, and will not be described further herein.

The present invention allows a utility to target where they want to spend their money. For instance, at the end of the year, the utility reviews that data and determines they have served X number of thousand customers, and their reportable indices to the Public Utilities Commission, which is called SAFEE (the number of outages per number of customers served) was 0.9. This can be done at the circuit level. Therefore, that circuit had a safety of 0.9, which previously might mean nine tenths of the customers on the circuit experienced an outage, which means, theoretically, one tenth of them did not. With the present invention's ability to allow utilities to view results at the customer level, the 0.9 could mean, not nine tenths of the customers experienced an outage, but that one tenth of the customers experienced an outage nine times. So now the utilities can better determine where the problem areas are, and where funds need to be distributed.

The present invention is not just simply mapping outages, but it is mapping the performance base against the typical customer's expectations. In one embodiment, the expectations are determined through customer surveys, but any method of calculating expectations can be used, as long as chosen using sound business judgment.

It is to be understood that the present invention is not limited to electric companies, but can be used by any company providing a continual service to multiple consumers.

The present invention allows the utility to create a record for each individual customer affected, tie each individual customer record to a project number, create an outage history for each customer, compare outage history for each customer to form an indicator (which can be a scale or a number), compare the indicator for each customer to a level of expectation, and place a graphic representation of a map showing the location of each customer, wherein the graphic representation will indicate by color (in one embodiment) how the indicator compares to the level of expectation. The indicator is intended to be used as a comparison to the level of expectation, and it is to be understood that the indicator and level of expectation can be calculated by any means, as long as chosen using sound business judgment.

At least one embodiment has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for tracking power outages, the method comprising the steps of:
   receiving information that at least one power outage has occurred;
   relaying the information regarding the at least one power outage to a database;
   determining at least one circuit affected by the at least one power outage;
   determining a number of customers associated with the at least one circuit; and,
   creating an individual outage record for each associated customer;
   creating an indicator based on an expectation scale,
   wherein creating an indicator scale further comprises the steps of:
      analyzing power outages for each associated customer;
      comparing the number of power outages for each associated customer with an expected number of power outages; and,
      creating at least two indicators, wherein one of the at least two indicators indicates that the number of power outages is at or exceeds the number of expected power outages, wherein one of the at least two indicators indicates that the number of power outages is below the expected number of power outages.

2. The method of claim 1, wherein the method comprises three indicators, wherein a first indicator indicates that the number of power outages exceeds the number of expected power outages, a second indicator indicates that the number of power outages is below the number of expected power outages, and a third indicator indicates that the number of power outages is below the number of expected power outages, but is approaching the number of expected power outages.

3. The method of claim 2, wherein each indicator is a different color.

4. The method of claim 3, wherein the first indicator is red, the second indicator is green, and the third indicator is yellow.

5. A method for tracking power outages, the method comprising the steps of:
   receiving a signal that at least one power outage has occurred;
   relaying information regarding the at least one power outage to a database;
   determining at least one circuit affected by the at least one power outage;
   determining a number of customers associated with the at least one circuit;
   creating an individual outage record for each associated customer, wherein the outage record comprises at least a date of the power outage, a time of the power outage, a date of resumption of power, a time of resumption of power, a reason for the power outage, and a project number;
   analyzing the power outages for each associated customer;
   comparing the number of power outages for each associated customer with an expected number of power outages; and,
   creating three indicators, wherein a first indicator indicates that the number of power outages exceeds the number of expected power outages, a second indicator indicates that the number of power outages is below the number of expected power outages, and a third indicator indicates that the number of power outages is below the number of expected power outages, but is approaching the number of expected power outages.

6. A method for tracking events, the method comprising the steps of:
   receiving information that at least one event has occurred;
   relaying the information regarding the at least one event to a database;
   determining a number of customers associated with the at least one event;
   creating an individual event record for each associated customer;
   analyzing the events for each associated customer;
   comparing the number of events for each associated customer with an expected number of events; and,
   wherein the method comprises three indicators, wherein a first indicator indicates that the number of events exceeds the number of expected events, a second indicator indicates that the number of events is below the number of expected events, and a third indicator indicates that the number of events is below the number of expected events, but is approaching the number of expected events, wherein the events are defined by an unexpected interruption of service.

7. The method of claim 6, wherein each indicator is a different color.

8. The method of claim 7, wherein the first indicator is red, the second indicator is green, and the third indicator is yellow.

* * * * *